No. 728,832. PATENTED MAY 26, 1903.
J. W. BAIN & C. C. DURBOROW.
LIQUID AND GASEOUS FUEL BURNER.
APPLICATION FILED AUG. 8, 1902.
NO MODEL. 2 SHEETS—SHEET 1.

Witnesses
Harry L. Amer.
Wm. H. Bates

Inventors
John W. Bain
Charles C. Durborow.
by J. N. Hicks,
Attorney.

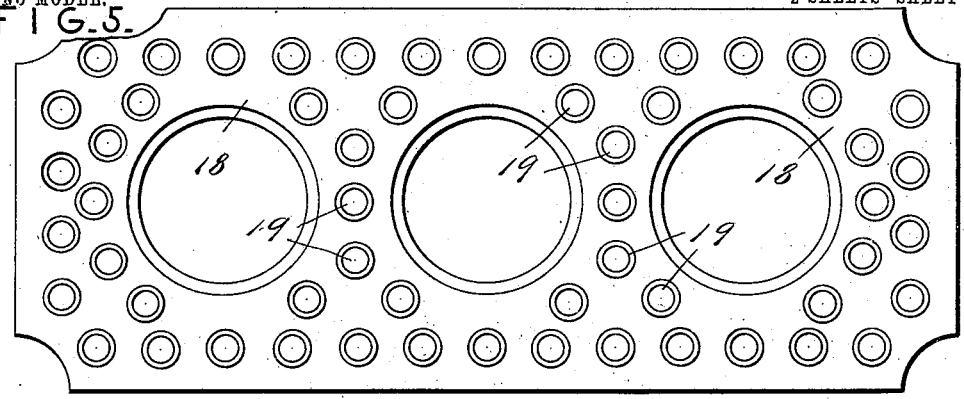
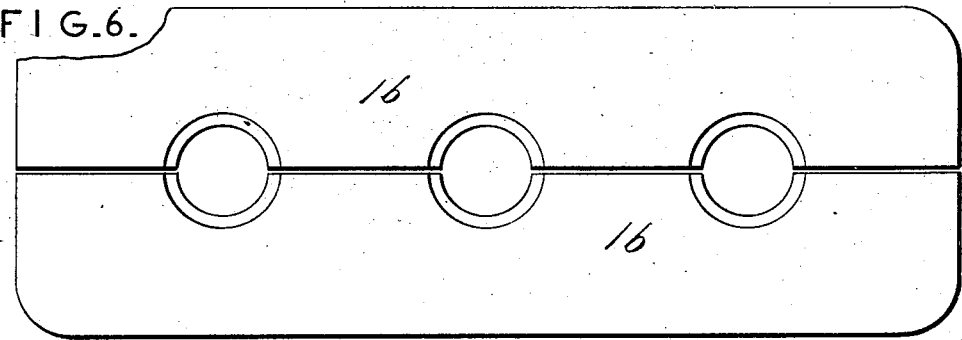
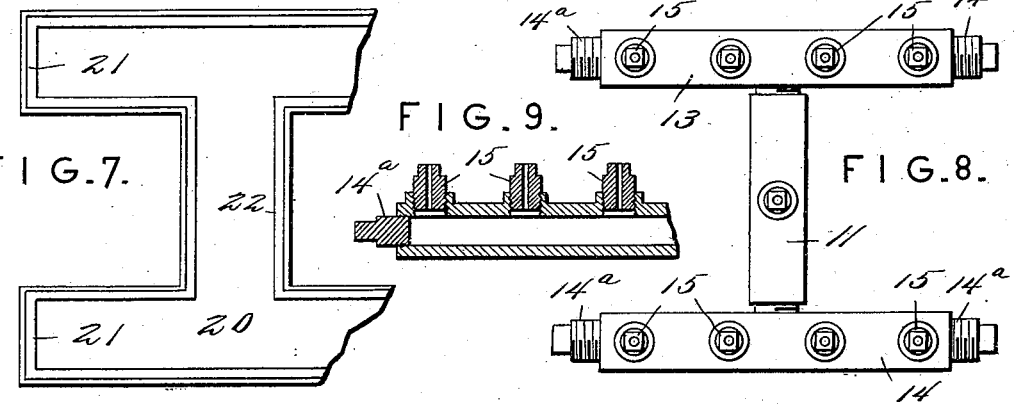

No. 728,832. Patented May 26, 1903.

UNITED STATES PATENT OFFICE.

JOHN W. BAIN AND CHARLES C. DURBOROW, OF ALTOONA, PENNSYLVANIA.

LIQUID AND GASEOUS FUEL BURNER.

SPECIFICATION forming part of Letters Patent No. 728,832, dated May 26, 1903.

Application filed August 8, 1902. Serial No. 118,954. (No model.)

*To all whom it may concern:*

Be it known that we, JOHN W. BAIN and CHARLES C. DURBOROW, citizens of the United States of America, residing at Altoona, in the county of Blair and State of Pennsylvania, have invented certain new and useful Improvements in Liquid and Gaseous Fuel Burners, of which the following is a specification.

Our invention has relation to improvements in liquid and gaseous fuel burners of that kind or class denominated "retort-vaporizers;" and the object is to provide a heating device or apparatus which will economically, safely, and efficiently utilize a hydrocarbon fuel to produce adequate caloric effects for all heating and cooking purposes.

The invention embodies a construction and assemblage of parts fitted to the purposes intended and particularly adapted to be posited in the fire-pot or fire-chamber of cooking-stoves, ranges, and other domestic purposes of like construction where it is desirable to produce and communicate or impart heat to surfaces and compartments in a heating apparatus.

With these objects in view the invention consists in the novel construction of parts and their assemblage or aggroupment in operative combination, as will be hereinafter fully described, and distinctly and particularly pointed out in the claims.

We have fully and clearly illustrated the invention in the annexed drawings, to be taken as a part of this specification, and wherein—

Figure 1:
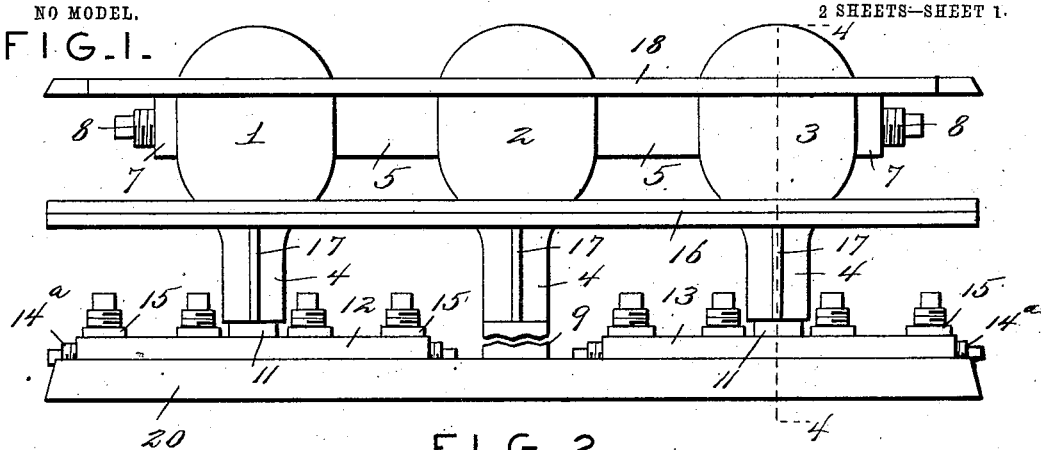
Figure 2:
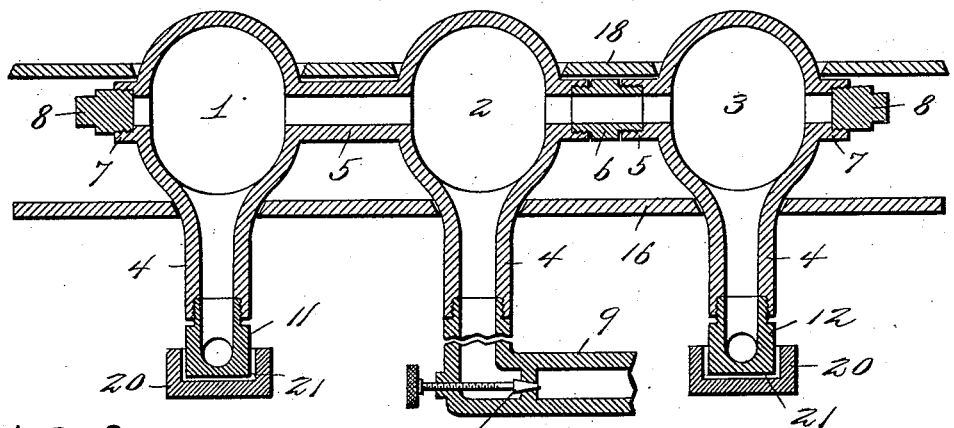
Figure 3:
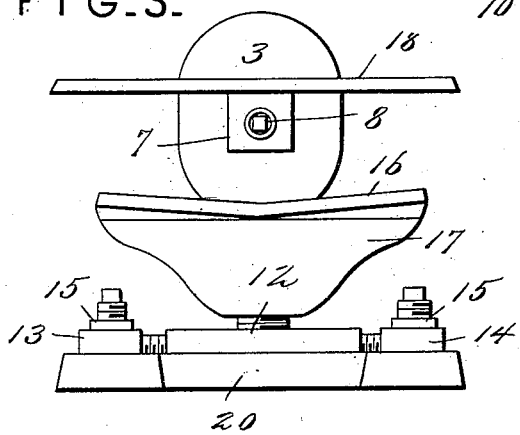
Figure 4:
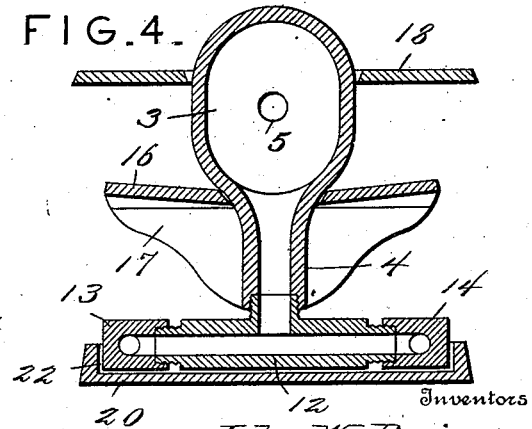

Figure 1 is a side view in elevation of the complete apparatus. Fig. 2 is a central vertical longitudinal section through the apparatus, showing a means for controlling the oil-feed to the retorts. Fig. 3 is an end view of the device, showing the burners, the deflectors, and the upper or top plate. Fig. 4 is a central vertical section taken on the line 4 4 of Fig. 1. Fig. 5 is a plan view of the apertured top plate, showing also the openings which set around the retorts. Fig. 6 is a plan view of the deflector-plate. Fig. 7 is a plan view of the bottom supporting-plate, in which the device is seated and supported. Fig. 8 is a plan view of one of the burner-frames. Fig. 9 is a longitudinal vertical section of one of the burner-tubes, showing the burners arranged therein.

Referring to the drawings, 1 2 3 designate fuel-retorts made of cast-iron and of such size and capacity as may suit them for the purposes intended. In shape they are generally cylindrical in vertical direction, with rounded ends, producing a rounded ovate contour. The lower ends of the retorts are extended into vertical depending stems or pipes 4. The retorts communicate with each other by pipes 5, which may be cast integral therewith, or these pipes may be made disconnected and then united by a coupling-sleeve 6, as shown in Fig. 2 of the drawings. The end retorts may have apertured thimbles or nipples 7, closed by threaded plugs 8, access to the interior being thus provided for and means made for connecting another retort when desired. The middle retort, to which the fuel is directly fed, has connected to it a feed-pipe 9, leading from a source of supply and provided with a suitable valve 10 for regulating the supply.

On the lower end of the depending stems of the retorts 1 and 3 are fixed cross-pipes 11 12, having their ends secured in the burner-pipes 13 14, arranged opposite to and parallel with each other. In the burner-pipes are placed a requisite number of suitable burners 15, through which the vaporized fuel is delivered for consumption. Detachable plugs 14ª are fitted in the ends of the burner-pipes, so that the interior may be reached and the pipes cleaned.

At the base of the retorts is arranged a deflector-plate 16, having the stems of the retorts projected through it and supported by brackets 17, bracing against the stems of the retorts, as indicated. The plates of the deflector incline upward from the center outward, so that the heat rising from the burners will be carried direct against the walls of the fire box or chamber wherein the apparatus is placed. On the upper ends of the retorts is placed a plate 18, made with holes to set around the retorts and also provided with a plurality of apertures 19, through which the heat rises.

The apparatus as thus far described sets or stands in a base-piece 20, formed with channels 21 in its parallel side pieces and cross-channels 22, communicating therewith. It will be seen that the cross-pipes and burner-pipes correspond in arrangement and shape to the channels in the base-piece and rest therein. The channels of the base-piece are made of such width and depth as to afford ample room for depositing an absorbent material therein about and on the burner-pipes. The absorbent material is preferably asbestos fiber and constitutes the means for receiving and retaining the fuel charge for the preliminary heating of the device.

Slag or silts is placed in a thin layer upon and above the deflectors and forces as well as retains the heat in the fire-box, and the heat passing through or permeating the slag or silts heats the same to a red heat, thus thoroughly heating the lids and top of the stove, as well as the upper part thereof.

The retorts are covered with a suitable coating of asbestos to prevent them from becoming unduly heated and obviating the decarbonization of the fuel and the clogging of the retorts and pipes with the residuum of carbon, which has heretofore been one of the mediums of destruction of burners in this class of devices.

The utilization of the apparatus may be summarized as follows: The fuel is let on through the feed-pipe and rises into the middle retort, from where it runs into the adjacent retorts through the lateral connections and from thence down through their stems into the burner-frames and escapes in the form of vapor through the slits or perforations in the burners. It will be seen that the vapor issues at the bottom of the fire box or chamber, being at the lowest point, and the heat engendered or created is distributed throughout all the spaces and chambers of the fire-box and permeates all the elements in its path or course.

Having described our invention, what we claim is—

1. A liquid and gaseous fuel burner comprising a plurality of retorts formed with depending stems and communicating with each other, means to feed the fuel to one of the retorts, cross-pipes on the lower ends of the depending stems of the retorts, and vertically-disposed burner-tips carried on the ends of the cross-pipes.

2. A liquid and gaseous fuel burner comprising a retort having a vertically-depending stem, means to feed the fuel to the retort through the stem, retorts having vertically-depending stems and laterally-extending communicating pipes leading from the feeding-retort, cross-pipes on the ends of the depending stems, burner-tips carried on the ends of the cross-pipes, and a base-frame formed with channels wherein the cross-pipes are disposed.

3. A liquid and gaseous fuel burner comprising a retort having a vertically-depending stem, means to feed the fuel to the retort through the stem, retorts having vertically-depending stems and lateral-extending communicating pipes leading from the feeding-retort, cross-pipes on the ends of the depending stems, burner-tips carried on the ends of the cross-pipes, a base-plate formed with channels wherein the cross-pipes are disposed, and a deflecting-plate arranged over the burners and extending the length of the device.

4. A liquid and gaseous fuel burner comprising a retort having a vertically-depending stem, means to feed the fuel to the retort through the stem, retorts having vertically-depending stems and lateral-extending communicating pipes leading from the feeding-retort, cross-pipes on the ends of the depending stems, burner-pipes on the ends of said cross-pipes, burners in the burner-pipes, a base-plate formed with channels wherein the cross-pipes are disposed, a deflecting-plate arranged over the burners and extending the length of the device, and a perforated top plate formed with openings to engage about the upper portions of the retorts.

In testimony whereof we have affixed our signatures in presence of two witnesses.

JOHN W. BAIN.
CHARLES C. DURBOROW.

Witnesses:
CORN. EYNOR HICKS,
LEVI SPARR.